United States Patent
Barnes

(10) Patent No.: US 11,478,985 B2
(45) Date of Patent: Oct. 25, 2022

(54) BUILD MATERIAL FOR THREE-DIMENSIONAL PRINTING

(71) Applicant: HEWLETT-PACKARD DEVELOPMENT COMPANY, L.P., Spring, TX (US)

(72) Inventor: Arthur H Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 388 days.

(21) Appl. No.: 16/635,051

(22) PCT Filed: Oct. 18, 2017

(86) PCT No.: PCT/US2017/057211
§ 371 (c)(1),
(2) Date: Jan. 29, 2020

(87) PCT Pub. No.: WO2019/078855
PCT Pub. Date: Apr. 25, 2019

(65) Prior Publication Data
US 2020/0262146 A1    Aug. 20, 2020

(51) Int. Cl.
*B29C 64/314* (2017.01)
*B29C 64/165* (2017.01)
(Continued)

(52) U.S. Cl.
CPC .......... *B29C 64/314* (2017.08); *B29C 64/165* (2017.08); *C08K 3/22* (2013.01);
(Continued)

(58) Field of Classification Search
CPC ....... B29C 64/314; B29C 64/165; C08K 3/22; C08K 2003/2241; C08L 77/02;
(Continued)

(56) References Cited

U.S. PATENT DOCUMENTS 6,433,030 B1    8/2002   Blatter et al.
2012/0070619 A1    3/2012   Mikulak et al.
(Continued)

FOREIGN PATENT DOCUMENTS

WO    WO-2015108544 A1    7/2015
WO    WO-2016010424    1/2016
WO    WO-2016068899    5/2016

OTHER PUBLICATIONS

Circular Ocean WP3.1: potential applications of 3D printing (3DP) in ths recycling of fishing nets & ropes (FNR's), Jul. 27, 2016, http://research.uca.ac.uk/3276/.
(Continued)

*Primary Examiner* — Nahida Sultana
(74) *Attorney, Agent, or Firm* — Dierker & Kavanaugh PC

(57) ABSTRACT

An example of a build material for three-dimensional (3D) printing includes a preconditioned polymer or polymer composite powder. A percent crystallinity of the preconditioned polymer or polymer composite powder is reduced by a volume percentage ranging from about 0.5% to about 3% compared to a percent crystallinity of a corresponding untreated polymer or polymer composite powder.

15 Claims, 5 Drawing Sheets

(51) Int. Cl.
    *C08K 3/22*         (2006.01)
    *C08L 77/02*      (2006.01)
    *B33Y 10/00*      (2015.01)
    *B33Y 40/10*      (2020.01)
    *B33Y 70/10*      (2020.01)

(52) U.S. Cl.
    CPC ............... *C08L 77/02* (2013.01); *B33Y 10/00* (2014.12); *B33Y 40/10* (2020.01); *B33Y 70/10* (2020.01); *C08K 2003/2241* (2013.01)

(58) Field of Classification Search
    CPC ......... C08L 77/04; B33Y 10/00; B33Y 40/10; B33Y 70/10; B33Y 70/00
    See application file for complete search history.

(56) References Cited

U.S. PATENT DOCUMENTS

2013/0330993 A1   12/2013   Dwarshuis et al.
2019/0308369 A1*  10/2019   Shiraishi ............... B29C 64/153
2020/0255661 A1*   8/2020   Yasuda ................... C08L 77/02

OTHER PUBLICATIONS

Schmid, M et al., Influence of the Origin of Polyamide 12 Powder on the Laser Sintering Process and Laser Sintered Parts, Apr. 30, 2017, file:///c:/Users/djoshi/Downloads/www.mdpi.com/2076-3417/7/5/462/pdf.

* cited by examiner

BUILD MATERIAL FOR THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
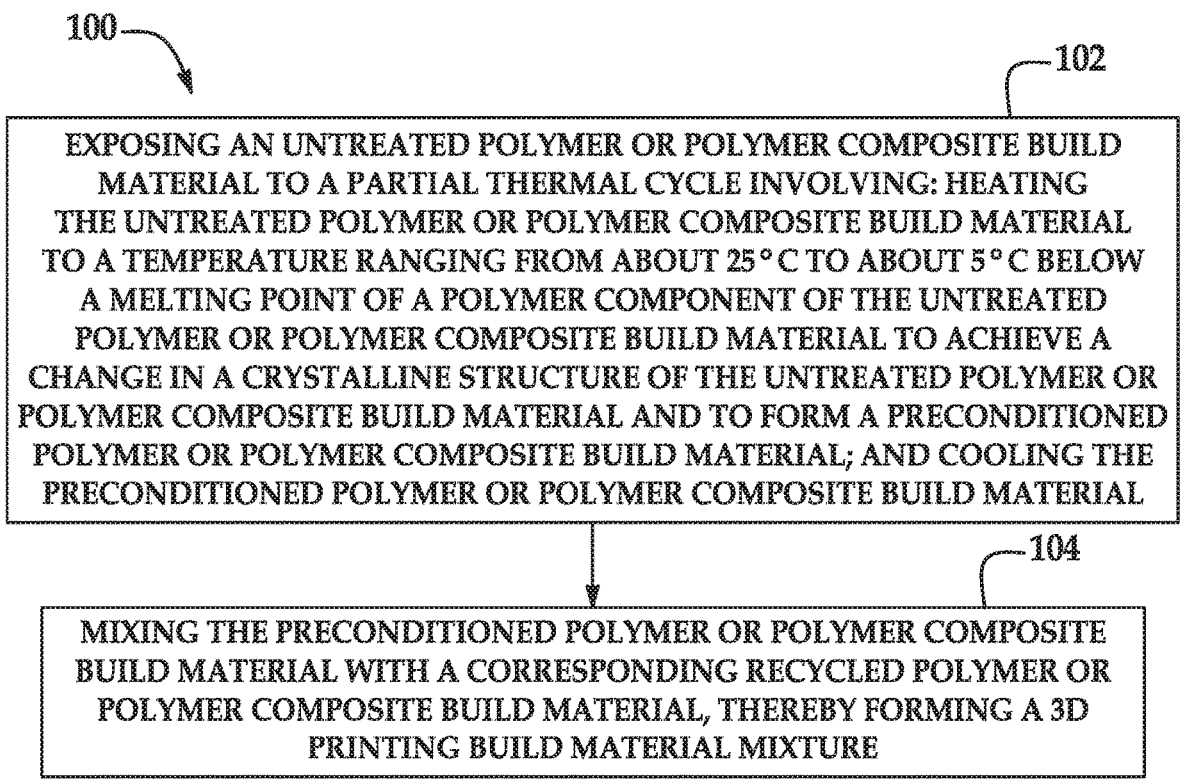
FIG. 1 is a flow diagram illustrating an example of a method of forming a build material mixture disclosed herein.

Some examples of three-dimensional (3D) printing may utilize a fusing agent to pattern polymer build material or polymer composite build material. In these examples, an entire layer of the polymer or polymer composite build material is exposed to electromagnetic radiation, but the patterned region (which, in some instances, is less than the entire layer) of the polymer or polymer composite build material is fused and hardened to become a layer of a 3D part. In the patterned region, the fusing agent is capable of at least partially penetrating into voids between the polymer or polymer composite build material particles, and is also capable of spreading onto the exterior surface of the polymer or polymer composite build material particles. This fusing agent is capable of absorbing electromagnetic radiation and converting the absorbed electromagnetic radiation to thermal energy, which in turn fuses the polymer or polymer composite build material that is in contact with the fusing agent. Fusing causes the patterned polymer or polymer composite build material to join or blend to form a single entity (i.e., the layer of the 3D part), and fusing may involve at least partially thermally merging, melting, binding, curing, etc. of the build material to form the layer of the 3D part.

After a 3D part is printed, the unpatterned (and therefore, unfused) polymer or polymer composite build material that is not bound to the 3D part may be recycled, i.e., removed from the 3D part (in some instances rinsed and dried) and used as build material in the printing of another 3D part. Recycled polymer or polymer composite build material may be mixed with its corresponding untreated polymer or polymer composite build material in any desirable weight ratio (ranging from 1:99 to 99:1). One example weight ratio includes 4:1 recycled polymer or polymer composite build material to untreated polymer or polymer composite). However, it has been discovered that recycled polymer or polymer composite build material does not have the same percent crystallinity (by volume), melting point, and melt enthalpy (i.e., the heat or energy to change the material from a solid to a liquid) as its corresponding untreated polymer or polymer composite build material. These differences may cause the recycled polymer or polymer composite build material and its corresponding untreated polymer or polymer composite build material to melt unequally during the fusing process, which can form 3D parts having varying part quality and/or mechanical properties. 3D printers are often capable of applying the same energy delivery throughout the fusing process, and thus printers tuned for the untreated polymer or polymer composite build material alone will over fuse the recycled polymer or polymer composite build material. Conversely, if the 3D printer is tuned for the recycled polymer or polymer composite build material, the untreated polymer or polymer composite build material will be under fused.

Disclosed herein is a build material that includes a preconditioned polymer or polymer composite build material. The preconditioned polymer or polymer composite build material is an untreated polymer or polymer composite build material that has been exposed to a partial thermal cycle. The partial thermal cycle reduces the percent crystallinity, the melting point, and/or the melt enthalpy of the untreated polymer or polymer composite build material and produces the preconditioned polymer or polymer composite build material.

As used herein, the term "partial thermal cycle" refers to a process of cycling the untreated polymer build material or polymer composite build material through heating and cooling, where heating is to a temperature that is at least 5° C. below the melting point of the polymer component of the untreated polymer build material or untreated polymer composite build material, and then cooling occurs rapidly in order to stop or inhibit crystal growth. The thermal cycle is considered a partial thermal cycle because while two temperature extremes are used, the polymer build material or polymer composite build material does not reach or exceed its melting temperature. As such, the partial thermal cycle does not melt the polymer or polymer composite build material.

Also as used herein, the term "untreated polymer or polymer composite build material" (also known as virgin polymer or polymer composite build material) refers to polymer build material or polymer composite build material that has not been exposed to a 3D printing process and/or has not been exposed to a temperature greater than or equal to 25° C. below the melting point of its polymer component.

The term "recycled polymer or polymer composite build material," as used herein, refers to polymer or polymer composite build material that has undergone at least one 3D print process. In other words, recycled polymer or polymer composite build material is build material that was used as the build material in a 3D print process, was unpatterned in that process (i.e., was not in contact with a fusing agent), and was recovered after the 3D part was generated.

Still further, as used herein, the term "preconditioned polymer or polymer composite build material" refers to polymer or polymer composite build material that has been exposed to the partial thermal cycle disclosed herein. In other words, the preconditioned polymer or polymer composite build material is untreated polymer or polymer composite build material that has been exposed to a temperature ranging from about 25° C. to about 5° C. below a melting point of its polymer component, followed by rapid cooling.

As used herein, the term "corresponding," when used in combination with untreated, recycled build material, and/or preconditioned build material, refers to polymer or polymer composite build materials of the same type (i.e., having the same chemical structure), but that may have been exposed to different thermal conditions (e.g., the thermal conditions associated with being untreated polymer or polymer composite build material, the thermal conditions associated with being recycled polymer or polymer composite build material, or the thermal conditions associated with being preconditioned polymer or polymer composite build material). For example, untreated polyamide 12 (PA 12) corresponds with recycled polyamide 12 (i.e., polyamide 12 that has undergone at least one 3D print process) and with preconditioned polyamide 12 (i.e., polyamide 12 that has undergone the partial thermal process disclosed herein. Each of these polyamide 12 build materials is still polyamide 12, even though they may have different crystalline structures, melt enthalpies, and melting points.

Referring now to FIG. 1, a method 100 of forming a 3D printing build material mixture is depicted. One example of the method 100 comprises: exposing an untreated polymer or polymer composite build material to a partial thermal cycle involving: heating the untreated polymer or polymer composite build material to a temperature ranging from about 25° C. to about 5° C. below a melting point of a polymer component of the untreated polymer or polymer composite build material to achieve a change in a crystalline structure of the untreated polymer or polymer composite build material and to form a preconditioned polymer or polymer composite build material; and cooling the preconditioned polymer or polymer composite build material (reference numeral 102); and mixing the preconditioned polymer or polymer composite build material with a corresponding recycled polymer or polymer composite build material, thereby forming the 3D printing build material mixture 16 (reference numeral 104).

As shown at reference numeral 102, the method includes exposing an untreated polymer or polymer composite build material to a partial thermal cycle. The untreated polymer or polymer composite build material may be a polymer build material or a polymer composite build material. As used herein, the term "polymer build material" may refer to crystalline or semi-crystalline polymer particles. As used herein, the term "polymer composite build material" may refer to composite particles made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., polyamide 11 (PA 11/nylon 11), polyamide 12 (PA 12/nylon 12), polyamide 6 (PA 6/nylon 6), polyamide 8 (PA 8/nylon 8), polyamide 9 (PA 9/nylon 9), polyamide 66 (PA 66/nylon 66), polyamide 612 (PA 612/nylon 612), polyamide 812 (PA 812/nylon 812), polyamide 912 (PA 912/nylon 912), etc.). Other examples of crystalline or semi-crystalline polymers suitable for use as the untreated polymer build material include polyethylene, polypropylene, and polyoxomethylene (i.e., polyacetals). Still other examples of suitable untreated polymer build materials include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the untreated polymer composite build material. Examples of suitable ceramic particles include metal oxides, inorganic glasses, carbides, nitrides, and borides. Some specific examples include alumina (aluminum oxide or $Al_2O_3$), glass, silicon mononitride (SiN), silicon dioxide ($SiO_2$), zirconia (zirconium oxide or $ZrO_2$), titania (titanium dioxide or $TiO_2$), or combinations thereof. The amount of ceramic particles that may be combined with the crystalline or semi-crystalline polymer particles may depend on the materials used and the 3D part to be formed. In one example, the ceramic particles may be present in an amount ranging from about 1 wt % to about 20 wt % based on the total weight of the untreated polymer composite build material. One example of the polymer composite build material includes about 97 wt % of polyamide 12 and about 3 wt % of titanium dioxide.

In some examples, the polymer or polymer composite build material may be in the form of a powder. In other examples, the polymer or polymer composite build material may be in the form of a powder-like material, which includes, for example, short fibers having a length that is greater than its width.

The untreated polymer or polymer composite build material may have a melting point ranging from about 50° C. to about 400° C. For the polymer composite build materials, the melting point generally refers to the melting point of the polymer component of the composite. This is because the melting point of the ceramic component of the composite is much higher than the polymer component of the composite, and thus to keep the composite from melting, the heating temperature is below the melting point of the polymer component. As an example, the untreated polymer build material may be a polyamide having a melting point of about 180° C. As another example, the untreated polymer composite build material may be a polyamide and titanium dioxide mixture, which is considered to have a melting point of about 180° C. even though the melting point of the titanium dioxide portion is about 1,843° C.

The untreated polymer or polymer composite build material may be made up of similarly sized particles or differently sized particles. The term "size", as used herein with regard to the polymer or polymer composite build material (whether untreated, recycled, or preconditioned), refers to the diameter of a spherical particle or a fiber, or the average diameter of a non-spherical particle (i.e., the average of multiple diameters across the particle or fiber), or the volume-weighted mean diameter of a particle distribution. In an example, the average size of the untreated polymer or polymer composite build material ranges from about 2 μm to about 200 μm. In another example, the average size of the untreated polymer or polymer composite build material ranges from about 20 μm to about 90 μm. In still another example, the average size of the untreated polymer or polymer composite build material is about 60 μm. In yet a further example, the untreated polymer or polymer composite build material has a particle size distribution ranging from about 2 μm to about 100 μm, with an average particle size of about 40 μm.

As mentioned above, the partial thermal cycle (to which the untreated polymer or polymer composite build material is exposed) does not exceed a temperature that is 5° C. below the melting point of the polymer component of untreated polymer or polymer composite build material. As such, the partial thermal cycle does not cause the untreated polymer or polymer composite build material to melt, which allows it to retain its build material form and remain usable as a build material for 3D printing.

The partial thermal cycle includes heating the untreated polymer or polymer composite build material to a temperature ranging from about 25° C. to about 5° C. below the melting point of the polymer component of the untreated polymer or polymer composite build material. As such, the temperature to which the untreated polymer or polymer composite build material is heated depends on the type of untreated polymer or polymer composite build material used. In an example of the method 100, the temperature to which the build material is heated ranges from about 25° C. to about 395° C. In a more specific example, the untreated polymer build material is a polyamide 12 (with a melting point of about 189° C.), and the temperature for heating during the partial thermal cycle ranges from about 164° C. to about 184° C. As one example, a polyamide 12 build material may be preconditioned at about 170° C. In another specific example, the untreated polymer build material is a polyamide 11 (with a melting point of about 198° C.), and the temperature for heating during the partial thermal cycle ranges from about 173° C. to about 193° C. As one example, a polyamide 11 build material may be preconditioned at about 178° C. As another example, a polyamide 11 build material may be preconditioned at about 180° C. In yet another example, the untreated polymer composite build material is a composite of polyamide 12 and titanium dioxide (e.g., containing about 3 wt % of TiO$_2$, based on the total weight of the composite and with a melting point of the polymer component of about 189° C.), and the temperature for heating during the partial thermal cycle ranges from about 164° C. to about 184° C. As one example, a composite of polyamide 12 and 3 wt % titanium dioxide may be preconditioned at about 170° C.

The heating of the untreated polymer or polymer composite build material is accomplished to achieve a change in a crystalline structure of the untreated polymer or polymer composite build material. In other words, heating may take place at one or more conditions that are sufficient to cause a change in a crystalline structure of the untreated polymer or polymer composite build material.

In an example, heating takes place for a predetermined time period. The predetermined time period may vary depending, in part, upon the volume of the build material and/or the configuration of the build material. In an example, the predetermined time period is sufficient for all of the untreated polymer or polymer composite build material to reach and remain at the desired heating temperature for about 2 minutes. In an example of the method 100, the time period ranges from about 2 minutes to about 5 minutes. The time period may be longer, depending in part upon how long it takes to heat the untreated polymer or polymer composite build material to the desired heating temperature. In some instances, it may be desirable for the untreated polymer or polymer composite build material to remain at the desired heating temperature for about 5 minutes.

In some examples, the untreated polymer or polymer composite build material is heated in a thin layer (e.g., a layer with a thickness ranging from about 0.5 mm to about 2 mm). These thin layers may have a high surface area to volume ratio (e.g., a surface area to volume ratio equal to or greater than 5 cm$^{-1}$), thus exposing more of the build material surfaces than if in a bulk mass/configuration. It may be desirable to heat the untreated polymer or polymer composite build material in the thin layer so that all of the untreated polymer or polymer composite build material quickly reaches the desired heating temperature due to the amount of the untreated polymer or polymer composite build material being simultaneously exposed to conduction and convection heating. In some examples in which the untreated polymer or polymer composite build material is heated in the thin layer, the predetermined time period may range from about 2 minutes to about 5 minutes. In some specific examples in which the untreated polymer or polymer composite build material is heated in a thin layer, the thin layer may be applied onto a conveyor, and the conveyor may travel through an oven (maintained at the desire temperature). In these specific examples, each portion of the layer may remain in the oven for the predetermined time period ranging from about 2 minutes to about 5 minutes. As an example, an untreated polyamide 12 build material that is spread into the thin layer (e.g., a layer with a thickness ranging from about 0.5 mm to about 2 mm) may be heated for a time period greater than or equal to about 2 minutes. In some instances, the untreated polyamide 12 build material that is spread into the thin layer may be heated for a time period ranging from 2 minutes up to 5 minutes.

In other examples, the untreated polymer or polymer composite build material may be heated as a bulk mass (i.e., not in a thin layer). In these examples, the predetermined time period may be longer, and in some cases much longer, than about 5 minutes, in part because the build material at the center of the mass may take longer to heat up to the desired heating temperature. When the untreated polymer or polymer composite build material may be heated as a bulk mass, the heating temperature and the predetermined time period are selected so that the untreated polymer or polymer composite build material does not exceed a temperature 5° C. below the melting point of the polymer component of untreated polymer or polymer composite build material.

The partial thermal cycle also includes cooling the preconditioned polymer or polymer composite build material. The cooling process that is used may be a rapid cooling process (e.g., at rate ranging from about 10° C./second to about 20° C./second) so that crystal growth during cooling is stopped or inhibited. In an example, the preconditioned polymer or polymer composite build material is quenched to room temperature (e.g., a temperature ranging from about 18° C. to about 25° C.). In another example, the preconditioned polymer or polymer composite build material is quenched to a temperature below the crystallization temperature of the polymer component of the preconditioned polymer or polymer composite build material. When the polymer component of the preconditioned polymer or polymer composite build material is polyamide 12, the crystallization temperature may be about 145° C. When the polymer component of the preconditioned polymer or polymer composite build material is polyamide 11, the crystallization temperature may be about 165° C.

Quenching may be accomplished by placing the preconditioned polymer or polymer composite build material in contact with a plate at a temperature ranging from about 18° C. to about 25° C. In another example, quenching may be accomplished by placing the preconditioned polymer or polymer composite build material in contact with a plate at a temperature below the crystallization temperature of the polymer component of the preconditioned polymer or polymer composite build material. Cooling may also be accomplished by convective cooling, for example, when the build material is spread into a thin layer having a high surface area to volume ratio so that it can cool quickly. In any of these examples, the cooling process may be accomplished for a time sufficient to cool the preconditioned polymer or polymer composite build material to a temperature below the crystallization temperature of the polymer component of the preconditioned polymer or polymer composite build material (e.g., room temperature). The time may depend upon the cooling rate of the build material. In an example, the preconditioned polymer or polymer composite build material may be cooled at a rate ranging from about 10° C./second to about 20° C./second.

In an example, the partial thermal cycle does not occur on a build area platform 12 (see, e.g., FIG. 3A) and/or within a 3D printer 10 (see, e.g., FIGS. 3A through 3E and FIG. 4). Rather, the partial thermal cycle occurs as part of the production of the polymer or polymer composite build material.

As mentioned above, the partial thermal cycle reduces the percent crystallinity, the melting point, and/or the melt enthalpy of the untreated polymer or polymer composite build material and produces the preconditioned polymer or polymer composite build material. Specifically, the heating of the untreated polymer or polymer composite build material to the temperature ranging from about 25° C. to about 5° C. below the melting point of the polymer component of the untreated polymer or polymer composite build material forms the preconditioned polymer or polymer composite build material. If the untreated polymer or polymer composite build material is not heated to a high enough temperature, the partial thermal cycle may not reduce or may not sufficiently reduce the percent crystallinity, melting point, and/or melt enthalpy of the untreated polymer or polymer composite build material to produce the preconditioned polymer or polymer composite build material. Additionally, if the untreated polymer or polymer composite build material is heated to too high of a temperature, the untreated polymer or polymer composite build material may melt and become unusable as a build material for 3D printing.

The preconditioned polymer or polymer composite build material is made up of the same type of polymer or polymer composite as the untreated polymer or polymer composite build material. As such, the preconditioned polymer or polymer composite build material is one of: polymer particles exposed to a partial thermal cycle, the polymer particles being selected from the group consisting of a polyamide, polyethylene, polypropylene, polyoxomethylene, a polystyrene, polycarbonate, a polyester, a polyurethane, and combinations thereof; or a polymer ceramic composite exposed to a partial thermal cycle, the polymer ceramic composite including a blend of the polymer particles and ceramic particles, the ceramic particles being selected from the group consisting of metal oxides, inorganic glasses, carbides, nitrides, and borides.

The preconditioned polymer or polymer composite build material may be used as a build material (see, e.g., FIG. 3A) for 3D printing. In an example, the build material for three-dimensional (3D) printing comprises the preconditioned polymer or polymer composite build material, wherein a percent crystallinity of the preconditioned polymer or polymer composite build material is reduced by a volume percentage ranging from about 0.5% to about 3% compared to a percent crystallinity of a corresponding untreated polymer or polymer composite build material.

The preconditioned polymer or polymer composite build material may have a percent crystallinity (by volume) that is reduced as compared to the percent crystallinity (by volume) of the corresponding untreated polymer or polymer composite build material. In an example, the preconditioned polymer or polymer composite build material has a percent crystallinity that is reduced by a volume percentage ranging from about 0.5% to about 3% compared to the percent crystallinity of the corresponding untreated polymer or polymer composite build material. In another example, the preconditioned polymer or polymer composite build material is polyamide 12 exposed to the partial thermal cycle, and the percent crystallinity is reduced by up to 1 vol. %; or the preconditioned polymer or polymer composite build material is a composite of polyamide 12 and titanium dioxide exposed to the partial thermal cycle, and the percent crystallinity is reduced by up to 2 vol. %; or the preconditioned polymer or polymer composite build material is polyamide 11 exposed to the partial thermal cycle, and the percent crystallinity is reduced by up to 2.5 vol. %.

The preconditioned polymer or polymer composite build material may have a melting point that is reduced as compared to the melting point of the corresponding untreated polymer or polymer composite build material. In an example, the preconditioned polymer or polymer composite build material has a melting point that is reduced by a percentage ranging from about 1% to about 6% compared to the melting point of the corresponding untreated polymer or polymer composite build material.

The preconditioned polymer or polymer composite build material may have a melt enthalpy that is reduced as compared to the melt enthalpy of the corresponding untreated polymer or polymer composite build material. In an example, the preconditioned polymer or polymer composite build material has a melt enthalpy that is reduced by a percentage ranging from about 10% to about 40% compared to the melt enthalpy of the corresponding untreated polymer or polymer composite build material.

In one example of the build material, the preconditioned polymer or polymer composite build material has a reduced melting point and a reduced melt enthalpy compared to the melting point and the melt enthalpy of the corresponding untreated polymer or polymer composite build material.

As the preconditioned polymer or polymer composite build material is produced from the untreated polymer or polymer composite build material, the preconditioned polymer or polymer composite build material may have an average size that is similar to the average size of the untreated polymer or polymer composite build material. In an example, the average size of the preconditioned polymer or polymer composite build material ranges from about 2 μm to about 200 μm.

In some examples, the build material further comprises a corresponding recycled polymer or polymer composite build material mixed with the preconditioned polymer or polymer composite build material. These examples of the build material are referred to as the build material mixture 16. In an example, the weight ratio of the corresponding recycled polymer or polymer composite build material to preconditioned polymer or polymer composite build material ranges from about 1:99 to about 99:1. In one example, the weight ratio of the corresponding recycled polymer to the preconditioned polymer build material is about 4:1. In another example, the weight ratio of the corresponding recycled polymer composite build material to the preconditioned polymer composite build material is about 4:1.

The corresponding recycled polymer or polymer composite build material may have an average size that is similar to the average size of the preconditioned polymer or polymer composite build material. In an example, the average size of the corresponding recycled polymer or polymer composite build material ranges from about 2 μm to about 200 μm.

As shown at reference numeral 104, the method 100 includes mixing the preconditioned polymer or polymer composite build material with a corresponding recycled polymer or polymer composite build material, thereby forming a 3D printing build material mixture 16. Any desirable amounts of the recycled and preconditioned build materials may be mixed together in accordance with the weight ratios disclosed herein. In an example, the mixing may include mixing 4 parts of the corresponding recycled polymer or polymer composite build material for every 1 part of the preconditioned polymer or polymer composite build material.

In the examples disclosed herein, it is to be understood that the mixing may be performed in the printer 10 (see FIG. 4), or in a separate powder management station. As examples, mixing in the printer 10 may take place on the build area platform 12 (see FIGS. 3A and 4), in the build material supply 14 (see FIGS. 3A and 4), or in a separate mixing station. In some examples, the separate printing station may be set up to deliver the mixed build material 16 to the supply and/or platform 12.

In an example of the method 100, the preconditioned polymer or polymer composite build material and the corresponding recycled polymer or polymer composite build material each has a reduced melt enthalpy ranging from about 10% to about 40% lower than a melt enthalpy of a corresponding untreated polymer or polymer composite build material. Moreover, in some examples, the preconditioned polymer or polymer composite build material has a melt enthalpy within 10% of the melt enthalpy of the corresponding recycled polymer or polymer composite build material.

In some examples of the method 100, prior to mixing the preconditioned polymer or polymer composite build material with the corresponding recycled polymer or polymer composite build material, the method 100 further comprises sieving the preconditioned polymer or polymer composite build material to at least substantially reduce agglomeration. During some instances of heating, the polymer or polymer composite build material particles may agglomerate together. Sieving can at least substantially reduce the agglomerated particles. Agglomeration may be considered to be "at least substantially reduced" when the particle size of the sieved, preconditioned polymer or polymer composite build material has an average size that is within 10% of the average size of the original untreated polymer or polymer composite build material that was exposed to the partial thermal cycle to produce the preconditioned polymer or polymer composite build material. It may desirable to at least substantially reduce agglomeration so that the preconditioned polymer or polymer composite build material may function as a build material for 3D printing.

In some examples, the build material or the build material mixture 16 includes, in addition to the preconditioned polymer or polymer composite build material (and in some cases the corresponding recycled polymer or polymer composite build material), an antioxidant, a brightener, a charging agent, a flow aid, or combinations thereof.

Antioxidant(s) may be added to the build material or the build material mixture 16 to prevent or slow molecular weight decreases of the preconditioned polymer or polymer composite build material (and the corresponding recycled polymer or polymer composite build material when included) and/or may prevent or slow discoloration (e.g., yellowing) of the preconditioned polymer or polymer composite build material (and the corresponding recycled polymer or polymer composite build material when included) by preventing or slowing oxidation of the preconditioned polymer or polymer composite build material (and the corresponding recycled polymer or polymer composite build material when included). In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the build material or the build material mixture 16 in an amount ranging from about 0.01 wt % to about 5 wt % based on the total weight of the build material or the build material mixture 16.

Brightener(s) may be added to the build material or the build material mixture 16 to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be below a threshold temperature above which the stilbene derivative may become unstable. In an example, the brightener may be included in the build material or the build material mixture 16 in an amount ranging from about 0.01 wt % to about 10 wt % based on the total weight of the build material 16.

Charging agent(s) may be added to the build material or the build material mixture 16 to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int.

Ltd.). In an example, the charging agent is added in an amount ranging from greater than 0 wt % to less than 5 wt % based upon the total weight of the build material or the build material mixture 16.

Flow aid(s) may be added to improve the coating flowability of the build material or the build material mixture 16. Flow aids may be particularly beneficial when the particles of the preconditioned polymer or polymer composite build material (and the corresponding recycled polymer or polymer composite build material when included) are less than 25 µm in size. The flow aid improves the flowability of the build material or the build material mixture 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the build material or the build material mixture 16.

Referring now to FIG. 2 and FIGS. 3A through 3E, an example of a method 200, 300 for 3D printing is depicted. Prior to execution of the method 200, 300 or as part of the method 200, 300, a controller 30 (see, e.g., FIG. 4) may access data stored in a data store 32 (see, e.g., FIG. 4) pertaining to a 3D part that is to be printed. The controller 30 may determine the number of layers of build material 16 that are to be formed and the locations at which the fusing agent 26 from the applicator 24 is to be deposited on each of the respective layers.

Briefly, the method 200 for three-dimensional (3D) printing comprises: forming a build material layer 38 including at least some of a preconditioned polymer or polymer composite build material, wherein a percent crystallinity of the preconditioned polymer or polymer composite build material is reduced by a volume percentage ranging from about 0.5% to about 3% compared to a percent crystallinity of a corresponding untreated polymer or polymer composite build material (reference numeral 202); selectively applying a fusing agent 26 on at least a portion 40 of the build material layer 38 reference numeral 204); and exposing the build material layer 38 to electromagnetic radiation 44 to fuse the at least the portion 40 (reference numeral 206).

While not shown, the method 200, 300 may include forming the preconditioned polymer or polymer composite build material. In an example, the preconditioned polymer or polymer composite build material is formed prior to forming the build material layer. The preconditioned polymer or polymer composite build material may be formed in accordance with the method 100. To briefly reiterate from above, the preconditioned polymer or polymer composite build material may be formed by exposing the untreated polymer or polymer composite build material to a partial thermal cycle involving heating the untreated polymer or polymer composite build material to a temperature ranging from about 25° C. to about 5° C. below a melting point of a polymer component of the untreated polymer or polymer composite build material to achieve a change in a crystalline structure of the untreated polymer or polymer composite build material and to form the preconditioned polymer or polymer composite build material, and cooling the preconditioned polymer or polymer composite build material. The untreated polymer or polymer composite build material, the partial thermal cycle (including heating and cooling), and the preconditioned polymer or polymer composite build material may each be as described above in reference to the method 100. In a specific example of the method 200, 300, the temperature (to which the untreated polymer or polymer composite build material is heated) ranges from about 35° C. to about 395° C., and the heating is performed for a time period ranging from about 2 minutes to about 5 minutes.

Also while not shown, prior to forming build material layer 38 (FIG. 3B), the method 200, 300 may further comprise mixing the preconditioned polymer or polymer composite build material with the corresponding recycled polymer or polymer composite build material, thereby forming a 3D printing build material mixture 16; and the 3D printing build material mixture 16 is applied to form the build material layer 38. In these examples of the method 200, 300, the 3D printing build material mixture 16 is the build material and may include, in addition to the preconditioned polymer or polymer composite build material and the corresponding recycled polymer or polymer composite build material, the antioxidant, the brightener, the charging agent, the flow aid, or combinations thereof.

Figure 2:
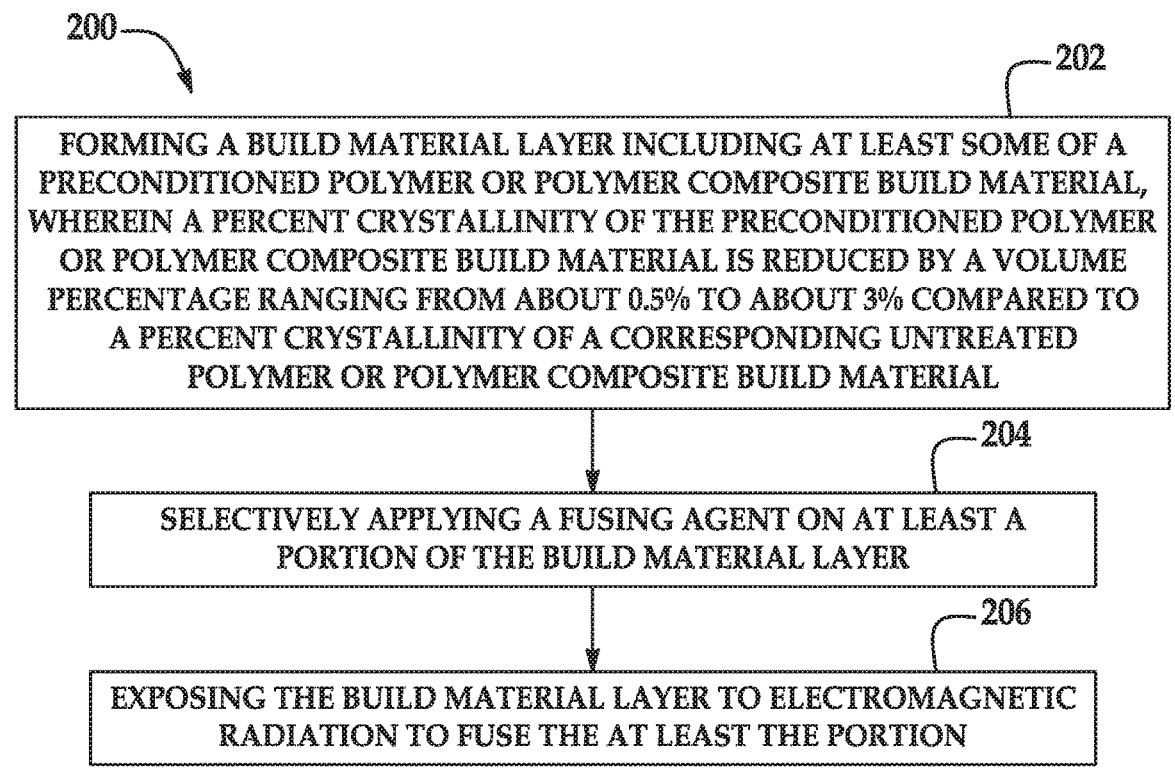
FIG. 2 is a flow diagram illustrating an example of a method for 3D printing disclosed herein.
Figure 3A:
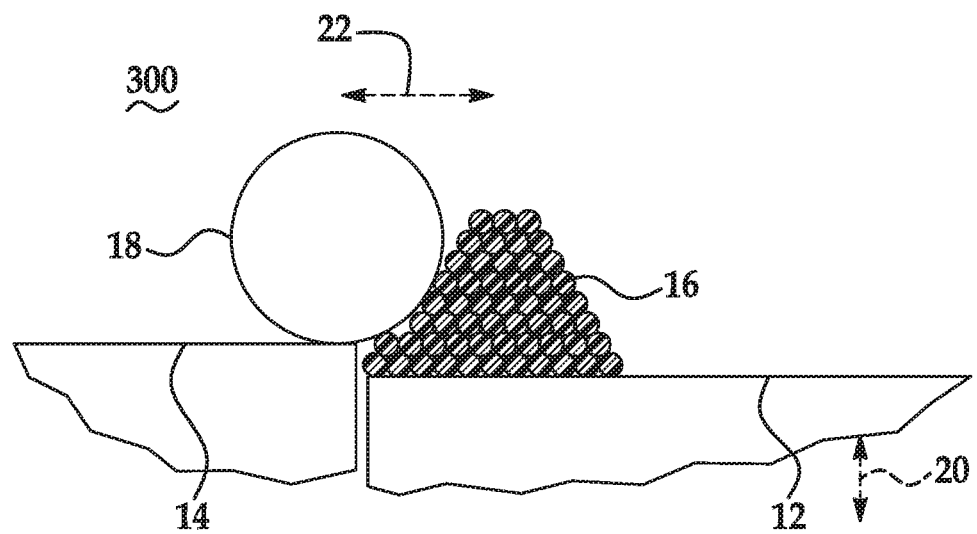
FIGS. 3A through 3E are schematic and partially cross-sectional cutaway views depicting the formation of a 3D part using an example of a 3D printing method disclosed herein.
Figure 3B:
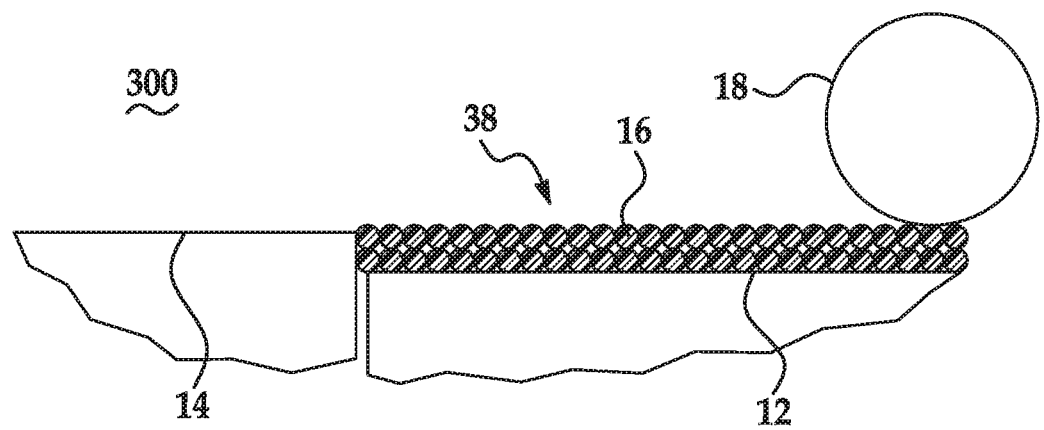

As shown at reference numeral 202 in FIG. 2 and in FIGS. 3A and 3B, the method 200, 300 includes forming the build material layer 38 including at least some of the preconditioned polymer or polymer composite build material (wherein a percent crystallinity of the preconditioned polymer or polymer composite build material is reduced by a volume percentage ranging from about 0.5% to about 3% compared to a percent crystallinity of a corresponding untreated polymer or polymer composite build material). As mentioned above, the build material (which forms the build material layer 38) includes at least the preconditioned polymer or polymer composite build material, and may additionally include the corresponding recycled polymer or polymer composite build material, the antioxidant, the brightener, the charging agent, the flow aid, or combinations thereof. As such, in an example, the build material is the preconditioned polymer or polymer composite build material; and, in another example, the build material is the build material mixture 16, which includes the preconditioned polymer or polymer composite build material and the corresponding recycled polymer or polymer composite build material.

Figure 4:
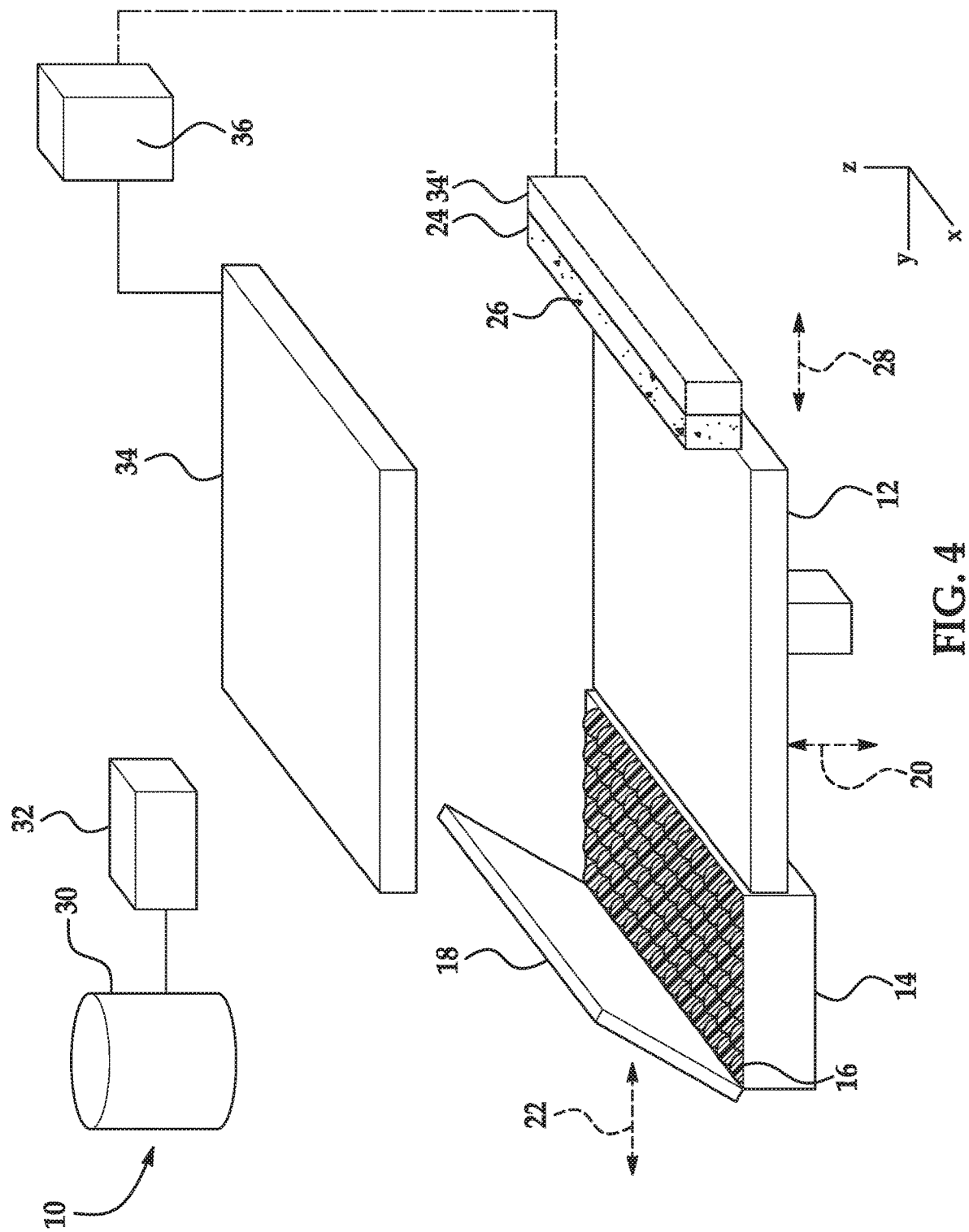
FIG. 4 is a simplified isometric and schematic view of an example of a 3D printing system disclosed herein.

In the example shown in FIGS. 3A and 3B, forming the build material layer 38 may include the use of a printing system (e.g., printing system 10 shown in FIG. 4). The printing system may include a build area platform 12, a build material supply 14 containing build material particles (e.g., mixture 16), and a build material distributor 18.

The build area platform 12 receives the build material or the build material mixture 16 from the build material supply 14. The build area platform 12 may be moved in a direction as denoted by the arrow 20, e.g., along the z-axis, so that the build material or build material mixture 16 may be delivered to the build area platform 12 or to a previously formed layer 46 (see, e.g., FIG. 3E) of the 3D part. In an example, when the build material or build material mixture 16 particles are to be delivered, the build area platform 12 may be programmed to advance (e.g., downward) enough so that the build material distributor 18 can push the build material or build material mixture 16 particles onto the build area platform 12 to form a substantially uniform build material layer 38 thereon. The build area platform 12 may also be returned to its original position, for example, when a new part is to be built.

The build material supply 14 may be a container, bed, or other surface that is to position the build material or build material mixture 16 particles between the build material distributor 18 and the build area platform 12.

The build material distributor 18 may be moved in a direction as denoted by the arrow 22, e.g., along the y-axis, over the build material supply 14 and across the build area platform 12 to spread the build material layer 38 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller.

As shown in FIG. 3A, the build material supply 14 may supply the build material or build material mixture 16 particles into a position so that they are ready to be spread onto the build area platform 12. In FIG. 3B, the build material distributor 18 may spread the supplied build material or build material mixture 16 particles onto the build area platform 12. The controller 30 may process control build material supply data, and in response control the build material supply 14 to appropriately position the build material or build material mixture 16 particles, and may process control spreader data, and in response control the build material distributor 18 to spread the supplied build material or build material mixture 16 particles over the build area platform 12 to form the build material layer 38 thereon. As shown in FIG. 3B, one build material layer 38 has been formed.

The build material layer 38 has a substantially uniform thickness across the build area platform 12. In an example, the thickness of the build material layer 38 is about 100 μm. In another example, the thickness of the build material layer 38 ranges from about 50 μm to about 300 μm, although thinner or thicker layers may also be used. For example, the thickness of the build material layer 38 may range from about 20 μm to about 500 μm, or from about 30 μm to about 300 μm. The layer thickness may be about 2× (i.e., 2 times) the particle diameter (as shown in FIG. 3B) at a minimum for finer part definition. In some examples, the layer thickness may be about 1.2× the particle diameter.

After the build material layer 38 is formed and prior to further processing, the build material layer 38 may be exposed to heating. Heating may be performed to pre-heat the build material or build material mixture 16 particles, and thus the heating temperature may be below the melting point of the polymer component of the preconditioned polymer or polymer composite build material (and below the melting point of the polymer component of the corresponding recycled polymer or polymer composite build material when the corresponding recycled polymer or polymer composite build material is included in the build material mixture 16). As such, the temperature selected will depend upon the build material or build material mixture 16 that is used. As examples, the pre-heating temperature may be from about 5° C. to about 50° C. below the melting point of the polymer component of the preconditioned polymer or polymer composite build material (and of the polymer component of the corresponding recycled polymer or polymer composite build material when applicable). In an example, the pre-heating temperature ranges from about 50° C. to about 250° C. In another example, the pre-heating temperature ranges from about 150° C. to about 170° C.

Pre-heating the build material layer 38 may be accomplished by using any suitable heat source that exposes all of the build material or build material mixture 16 particles on the build area platform 12 to the heat. Examples of the heat source include a thermal heat source (e.g., a heater (not shown) integrated into the build are platform 12) or the radiation source 34, 34'.

Figure 3C:
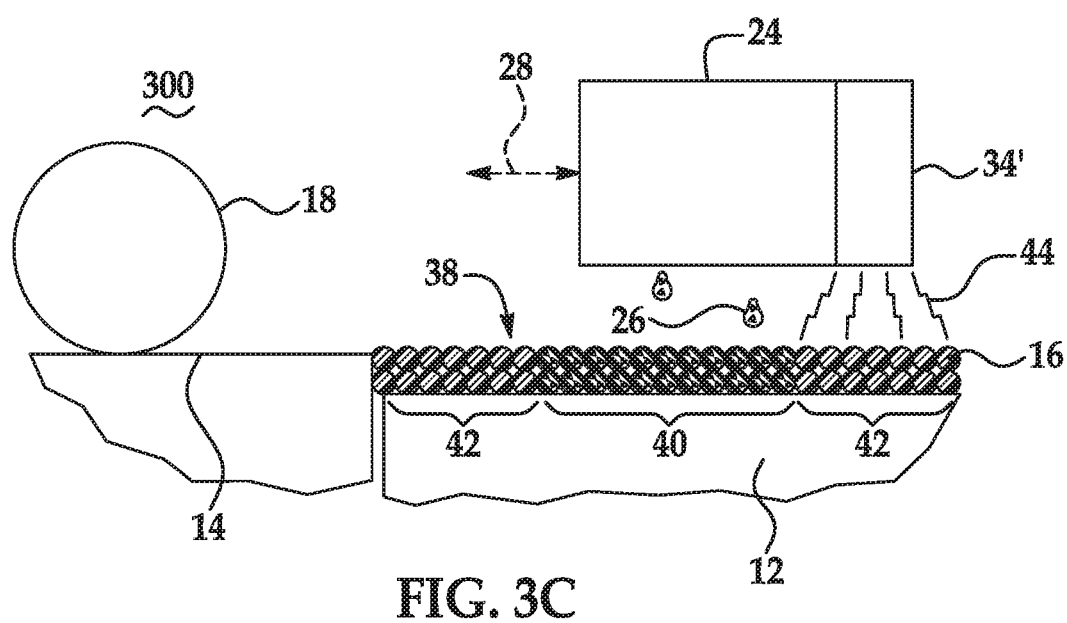

As shown at reference numeral 204 in FIG. 2 and in FIG. 3C, the method 200, 300 continues by selectively applying a fusing agent 26 on at least a portion 40 of the build material layer 38.

Examples of the fusing agent 26 are dispersions including a radiation absorbing agent (i.e., an active material). The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc. Other suitable active materials include near-infrared absorbing dyes or plasmonic resonance absorbers.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

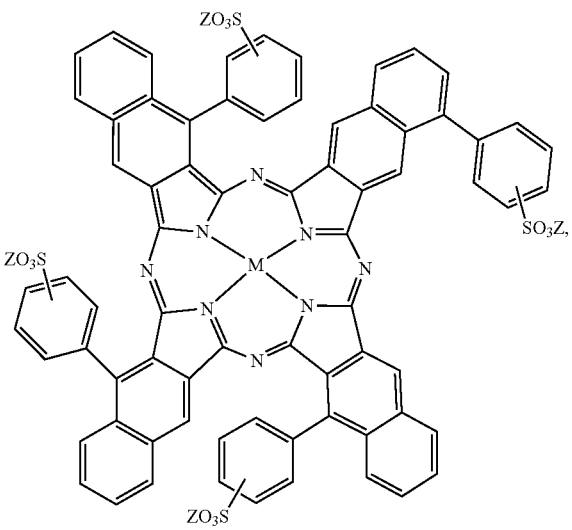

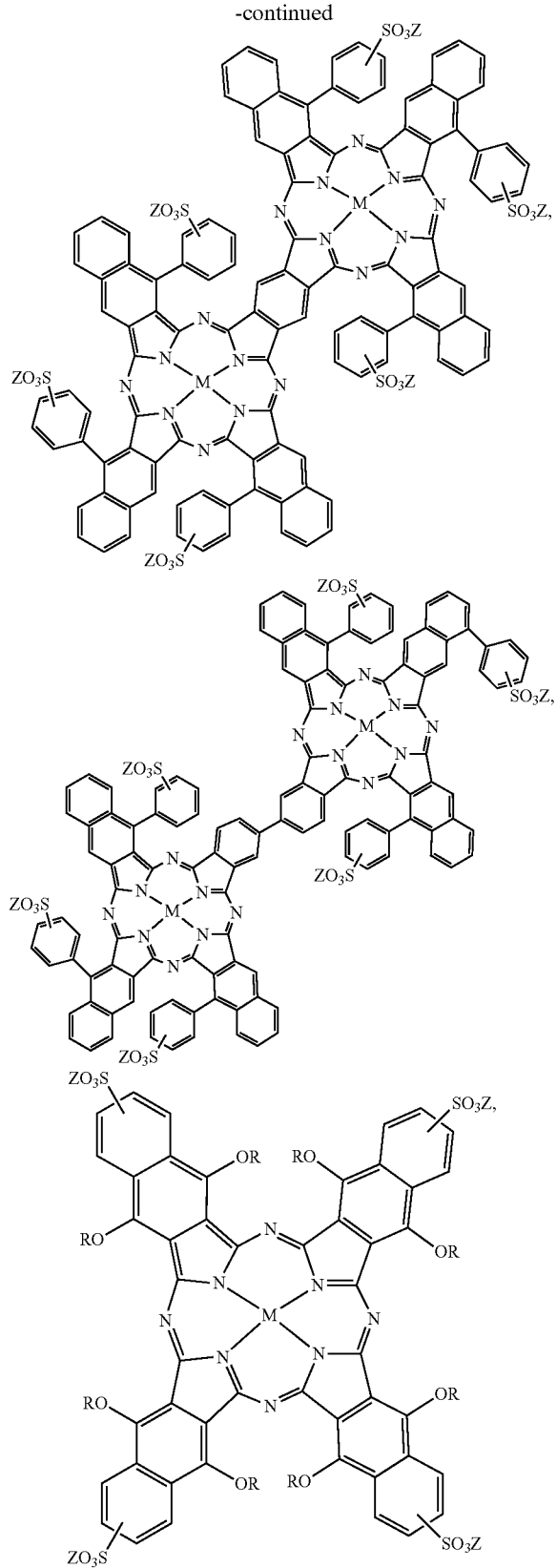

and mixtures thereof. In the above formulations, M can be a divalent metal atom (e.g., copper, etc.) or can have OSO₃Na axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

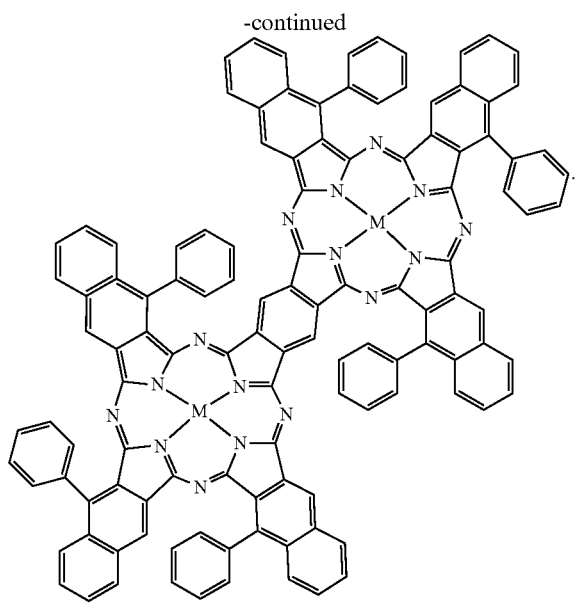

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

In other examples, the active material may be a plasmonic resonance absorber. The plasmonic resonance absorber allows the fusing agent 26 to absorb electromagnetic radiation 44 at wavelengths ranging from 800 nm to 4000 nm (e.g., at least 80% of radiation having wavelengths ranging from 800 nm to 4000 nm is absorbed), which enables the fusing agent 26 to convert enough electromagnetic radiation 44 to thermal energy so that the build material particles 16 fuse. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part to be white or slightly colored.

The absorption of the plasmonic resonance absorber is the result of the plasmonic resonance effects. Electrons associated with the atoms of the plasmonic resonance absorber may be collectively excited by electromagnetic radiation 44, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb electromagnetic radiation 44 with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total weight of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or electromagnetic radiation absorbance efficiency.

As used herein, "FA vehicle" may refer to the liquid fluid in which the active material is dispersed or dissolved to form the fusing agent 26. A wide variety of FA vehicles, including aqueous and non-aqueous vehicles, may be used in the fusing agent 26. In some examples, the FA vehicle may include water alone or a non-aqueous solvent alone with no other components. In other examples, the FA vehicle may include other components, depending, in part, upon the applicator 24 that is to be used to dispense the fusing agent 26. Examples of other suitable fusing agent fluid components include dispersant(s), silane coupling agent(s), co-solvent(s), surfactant(s), antimicrobial agent(s), anti-kogation agent(s), and/or chelating agent(s).

When the FA vehicle is water-based, the aqueous nature of the fusing agent 26 enables the fusing agent 26 to penetrate, at least partially, into the build material layer 38. The preconditioned polymer or polymer composite build material (and the corresponding recycled polymer or polymer composite build material when included in the build material 16) may be hydrophobic, and the presence of a dispersant, co-solvent, and/or a surfactant in the fusing agent 26 may assist in obtaining a particular wetting behavior.

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. Examples of suitable dispersants include polymer or small molecule dispersants, charged groups attached to the plasmonic resonance absorber surface, or other suitable dispersants. Some specific examples of suitable dispersants include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent 26 may range from about 10 wt % to about 200 wt % based on the weight of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the weight of the plasmonic resonance absorber in the fusing agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The primary solvent of the fusing agent 26 may be water or a non-aqueous solvent (e.g., ethanol, acetone, n-methyl pyrrolidone, aliphatic hydrocarbons, etc.). In some examples, the fusing agent 26 consists of the active material and the primary solvent (without other components). In these examples, the primary solvent makes up the balance of the fusing agent 26.

Classes of organic co-solvents that may be used in a water-based fusing agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents (i.e., humectants), which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent 26 in a total amount ranging from about 1 wt % to about 50 wt % based upon the total weight of the fusing agent 26, depending upon the jetting architecture of the applicator 24. In an example, the total amount of the co-solvent(s) present in the fusing agent 26 is 25 wt % based on the total weight of the fusing agent 26.

The co-solvent(s) of the fusing agent 26 may depend, in part upon the jetting technology that is to be used to dispense the fusing agent 26. For example, if thermal inkjet is to be used, water and/or ethanol and/or other longer chain alcohols (e.g., pentanol) may be the primary solvent (i.e., makes up 35 wt % or more of the fusing agent 26) or co-solvents. For another example, if piezoelectric inkjet is to be used, water may make up from about 25 wt % to about 30 wt % of the fusing agent 26, and the primary solvent (i.e., 35 wt % or more of the fusing agent 26) may be ethanol, isopropanol, acetone, etc.

In some examples the FA vehicle includes surfactant(s) to improve the jettability of the fusing agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.01 wt % to about 10 wt % based on the total weight of the fusing agent 26. In an example, the total amount of surfactant(s) in the fusing agent 26 may be about 3 wt % based on the total weight of the fusing agent 26.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 26 may include a total amount of antimicrobial agents that ranges from about 0.05 wt % to about 1 wt %. In an example, the antimicrobial agent(s) is/are a biocide(s) and is/are present in the fusing agent 26 in an amount of about 0.25 wt % (based on the total weight of the fusing agent 26).

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3 A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from greater than 0.20 wt % to about 0.65 wt % based on the total weight of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from greater than 0 wt % to about 2 wt % based on the total weight of the fusing agent 26. In an example, the chelating agent(s) is/are present in the fusing agent 26 in an amount of about 0.04 wt % (based on the total weight of the fusing agent 26).

It is to be understood that a single fusing agent 26 may be selectively applied on the portion 40, or multiple fusing agents 26 may be selectively applied on the portion 40. As an example, multiple fusing agents 26 may be used to create a multi-colored part. As another example, one fusing agent 26 may be applied to an interior portion of a layer and/or to interior layer(s) of a 3D part, and a second fusing agent 26 may be applied to the exterior portion(s) of the layer and/or to the exterior layer(s) of the 3D part. In the latter example, the color of the second fusing agent 26 will be exhibited at the exterior of the part.

As illustrated in FIG. 3C, the fusing agent 26 may be dispensed from the applicator 24. The applicator 24 may be a thermal inkjet printhead, a piezoelectric printhead, a continuous inkjet printhead, etc., and the selectively applying of the fusing agent 26 may be accomplished by thermal inkjet printing, piezo electric inkjet printing, continuous inkjet printing, etc.

The controller 30 may process data, and in response, control the applicator 24 (e.g., in the directions indicated by the arrow 28) to deposit the fusing agent 26 onto predetermined portion(s) 40 of the build material layer 38 that are to become part of the 3D part. The applicator 24 may be programmed to receive commands from the controller 30 and to deposit the fusing agent 26 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 3C, the applicator 24 selectively applies the fusing agent 26 on those portion(s) 40 of the build material layer 38 that is/are to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the build material layer 38. In the example shown in FIG. 3C, the fusing agent 26 is deposited in a square pattern on the portion 40 of the build material layer 38 and not on the portions 42.

As mentioned above, the fusing agent 26 may include the active material and the FA vehicle. The volume of the fusing agent 26 that is applied per unit of the build material or build material mixture 16 in the patterned portion 40 may be sufficient to absorb and convert enough electromagnetic radiation 44 so that the preconditioned polymer or polymer composite build material (and the corresponding recycled polymer or polymer composite build material in the build material mixture 16) in the patterned portion 40 will fuse. The volume of the fusing agent 26 that is applied per unit of the build material or build material mixture 16 may depend, at least in part, on the active material used, the active material loading in the fusing agent 26, and the build material or build material mixture 16 used.

Figure 3D:
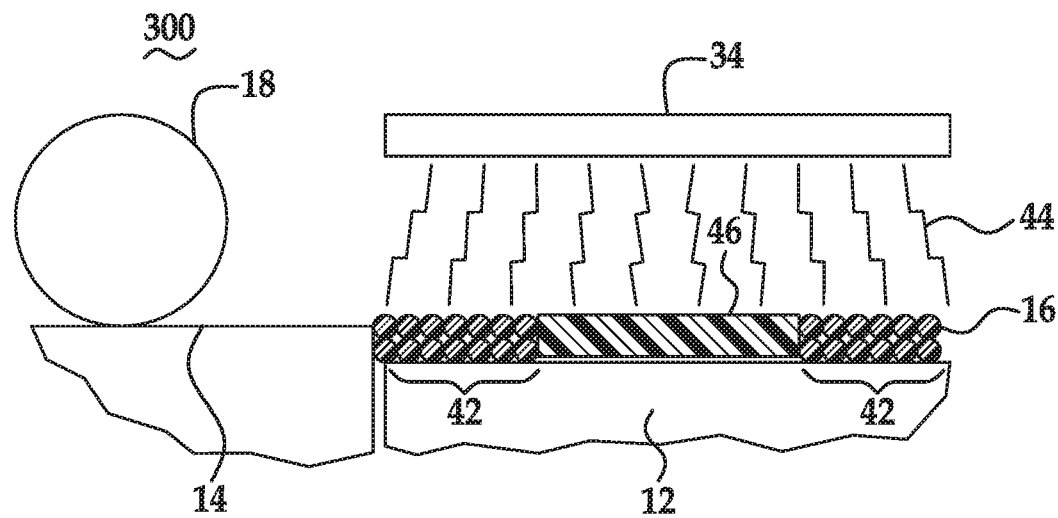

As shown at reference numeral 206 in FIG. 2 and FIGS. 3C and 3D, the method 200, 300 continues by exposing the build material layer 38 to electromagnetic radiation 44 to fuse the at least the portion 40. The electromagnetic radiation 44 may be applied with the source 34 of electromagnetic radiation 44 as shown in FIG. 3D or with the source 34' of electromagnetic radiation 44 as shown in FIG. 3C.

The fusing agent 26 enhances the absorption of the electromagnetic radiation 44, converts the absorbed electromagnetic radiation 44 to thermal energy, and promotes the transfer of the thermal heat to the build material or build material mixture 16 particles in contact therewith. In an example, the fusing agent 26 sufficiently elevates the temperature of the preconditioned polymer or polymer composite build material (and the corresponding recycled polymer or polymer composite build material the build material mixture 16) in the build material layer 38 above the melting point of the polymer component(s), allowing fusing (e.g., sintering, binding, curing, etc.) of the build material particles 16 take place. The application of the electromagnetic radiation 44 forms the fused layer 46, as shown in FIG. 3D.

It is to be understood that portions 42 of the build material layer 38 that do not have the fusing agent 26 applied thereto do not absorb enough electromagnetic radiation 44 to fuse. As such, these portions 42 do not become part of the 3D part that is ultimately formed. The build material 16 in portions 42 may be reclaimed to be reused as build material in the printing of another 3D part. As such, the portions of the build material may become recycled polymer or polymer composite build material that can be mixed with the preconditioned polymer or polymer composite build material for a subsequent 3D print cycle.

Figure 3E:
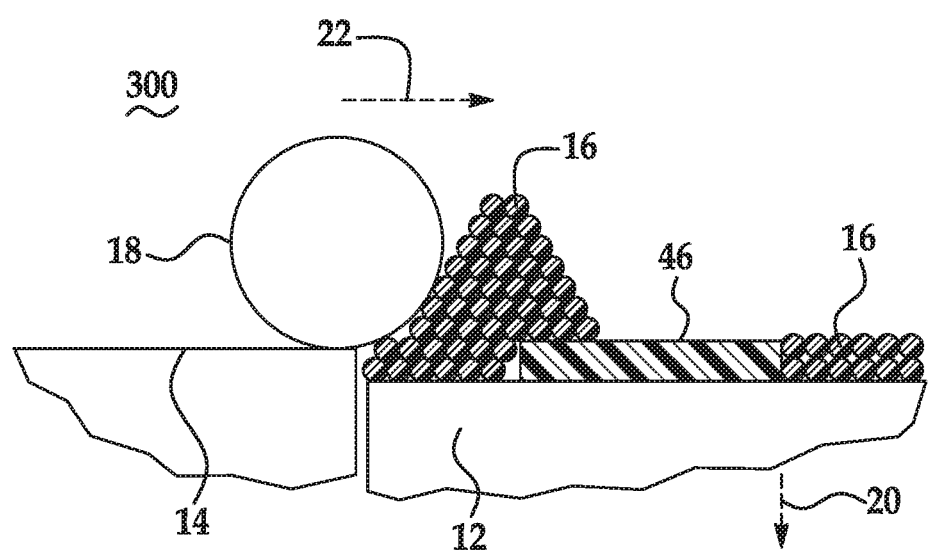

The processes shown in FIG. 2 and FIGS. 3A through 3D may be repeated to iteratively build up several fused layers and to form the 3D printed part. FIG. 3E illustrates the initial formation of a second build material layer on the previously formed layer 46. In FIG. 3E, following the fusing of the predetermined portion(s) 40 of the build material layer 38, the controller 30 may process data, and in response cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material or build material mixture 16 particles (e.g., through operation of an elevator, an auger, or the like) and the build material distributor 18 to form another build material layer on top of the previously formed layer 46 with the additional build material 16. The newly formed build material layer may be in some instances pre-heated, patterned with the fusing agent 26, and then exposed to electromagnetic radiation 44 from the source 34, 34' of electromagnetic radiation 44 to form the additional fused layer.

Referring now to FIG. 4, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 4 may not be drawn to scale and thus, the 3D printing system 10 may have a different size and/or configuration other than as shown therein.

In an example, the three-dimensional (3D) printing system 10, comprises: a supply 14 of build material or build material mixture 16 including a preconditioned polymer or polymer composite build material, wherein a percent crystallinity of the preconditioned polymer or polymer composite build material is reduced by a volume percentage ranging from about 0.5% to about 3% compared to a percent crystallinity of a corresponding untreated polymer or polymer composite build material; a build material distributor 18; a supply of a fusing agent 26; an applicator 24 for selectively dispensing the fusing agent 26; a source 34, 34' of electromagnetic radiation 44; a controller 30; and a non-transitory computer readable medium having stored thereon computer executable instructions to cause the controller 30 to: utilize the build material distributor 18 to dispense the build material or build material mixture 16 and form a build material layer 38; utilize the applicator 24 to selectively dispense the fusing agent 26 on at least a portion 40 of the build material layer 38; and utilize the source 34, 34' of electromagnetic radiation 44 to expose the build material layer 38 to electromagnetic radiation 44 to fuse the portion 40 of the build material layer 38.

As shown in FIG. 4, the printing system 10 includes the build area platform 12, the build material supply 14 containing the build material mixture 16 including the preconditioned polymer or polymer composite build material, and the build material distributor 18.

As mentioned above, the build area platform 12 receives the build material mixture 16 from the build material supply 14. The build area platform 12 may be integrated with the printing system or may be a component that is separately insertable into the printing system. For example, the build area platform 12 may be a module that is available separately from the printing system. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material mixture 16 between the build material distributor 18 and the build area platform 12. In some examples, the build material supply 14 may include a surface upon which the build material mixture 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material mixture 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material 16 over the build area platform 12 (e.g., a counter-rotating roller).

As shown in FIG. 4, the printing system 10 also includes the applicator 24, which may contain the fusing agent 26. The applicator 24 may be scanned across the build area platform 12 in the direction indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 4 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of the build material layer 38. The applicator 24 may thus be attached to a moving XY stage or a translational carriage (neither of which is shown) that moves the applicator 24 adjacent to the build area platform 12 in order to deposit the fusing agent 26 in predetermined areas 40 of the build material layer 38 that has been formed on the build area platform 12 in accordance with the method 200, 300 disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the applicator 24 is able to deliver variable drop volumes of the fusing agent 26. One example of a suitable printhead has 600 DPI resolution and can deliver drop volumes ranging from about 6 pl to about 14 pl.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material 16, the fusing agent 26, etc. may be derived from a model of the 3D part to be formed. For instance, the data may include the locations on each build material layer 38 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of build material 16 that is supplied by the build material supply 14, the movement of the build area platform 12, the movement of the build material distributor 18, the movement of the applicator 24, etc.

As shown in FIG. 4, the printing system 10 may also include a source 34, 34' of electromagnetic radiation 44. In some examples, the source 34 of electromagnetic radiation 44 may be in a fixed position with respect to the build material platform 12. In other examples, the source 34' of electromagnetic radiation 44 may be positioned to apply electromagnetic radiation 44 to the build material layer 38 immediately after the fusing agent 26 has been applied thereto. In the example shown in FIG. 4, the source 34' of electromagnetic radiation 44 is attached to the side of the applicator 24 which allows for patterning and heating/exposing to electromagnetic radiation 44 in a single pass.

The source 34, 34' of electromagnetic radiation 44 may emit electromagnetic radiation 44 having wavelengths ranging from about 800 nm to about 1 mm. As one example, the electromagnetic radiation 44 may range from about 800 nm to about 2 μm. As another example, the electromagnetic radiation 44 may be blackbody radiation with a maximum intensity at a wavelength of about 1100 nm. The source 34, 34' of electromagnetic radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of electromagnetic radiation 44 may be operatively connected to a lamp/laser driver, an input/output temperature controller, and temperature sensors, which are collectively shown as radiation system components 36. The radiation system components 36 may operate together to control the source 34, 34' of electromagnetic radiation 44. The temperature recipe (e.g., radiation exposure rate) may be submitted to the input/output temperature controller. During heating, the temperature sensors may sense the temperature of the build material 16, and the temperature measurements may be transmitted to the input/output temperature controller. For example, a thermometer associated with the heated area can provide temperature feedback. The input/output temperature controller may adjust the source 34, 34' of electromagnetic radiation 44 power set points based on any difference between the recipe and the real-time measurements. These power set points are sent to the lamp/laser drivers, which transmit appropriate lamp/laser voltages to the source 34, 34' of electromagnetic radiation 44. This is one example of the radiation system components 36, and it is to be understood that other radiation source control systems may be used. For example, the controller 30 may be configured to control the source 34, 34' of electromagnetic radiation 44.

To further illustrate the present disclosure, examples are given herein. It is to be understood these examples are provided for illustrative purposes and are not to be construed as limiting the scope of the present disclosure.

EXAMPLES

Example 1

Four examples of the preconditioned polymer build material disclosed herein were prepared, and one comparative example of preconditioned polymer build material was prepared. For each example and the comparative example, virgin/untreated polyamide 12 (PA 12) was exposed to a partial thermal cycle including heating the untreated polyamide 12 to a temperature for 15 minutes. The untreated polyamide 12 had a melting point of 188.79° C. and a melt enthalpy of 107 J/g. For one of the examples of the preconditioned polymer build material, the temperature was 165° C. (i.e., 23.79° C. below the melting point of the polymer component of the untreated polymer build material). For another of the examples of the preconditioned polymer build material, the temperature was 170° C. (i.e., 18.79° C. below the melting point of the polymer component of the untreated polymer build material). For another of the examples of the preconditioned polymer build material, the temperature was 175° C. (i.e., 13.79° C. below the melting point of the polymer component of the untreated polymer build material), and for the last example of the preconditioned polymer build material, the temperature was 180° C. (i.e., 8.79° C. below the melting point of the polymer component of the untreated polymer build material). For the comparative example of preconditioned polymer build material, the temperature was 160° C. (i.e., 28.79° C. below the melting point of the polymer component of the untreated polymer build material).

Figure 5:
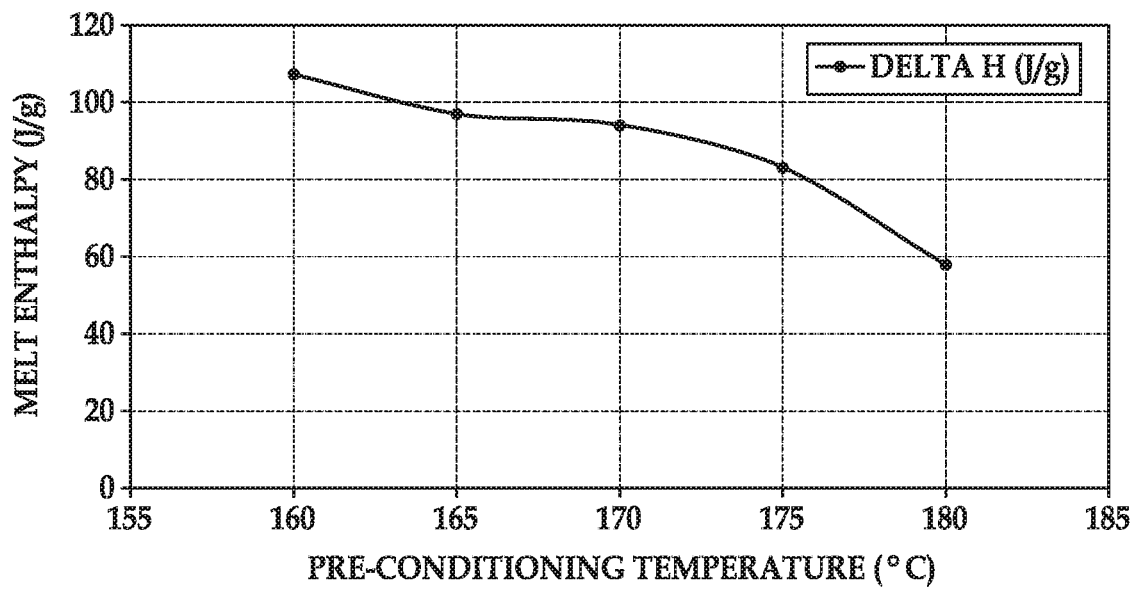
FIG. 5 is a graph of the melt enthalpies of examples of the preconditioned polymer build material disclosed herein and of a comparative example of preconditioned polymer build material as measured by a differential scanning calorimeter (DSC) as a function of the preconditioning temperature, with the melt enthalpy values (in J/g) shown on the y-axis and the preconditioning temperatures (in ° C.) shown on the x-axis.
Figure 6:
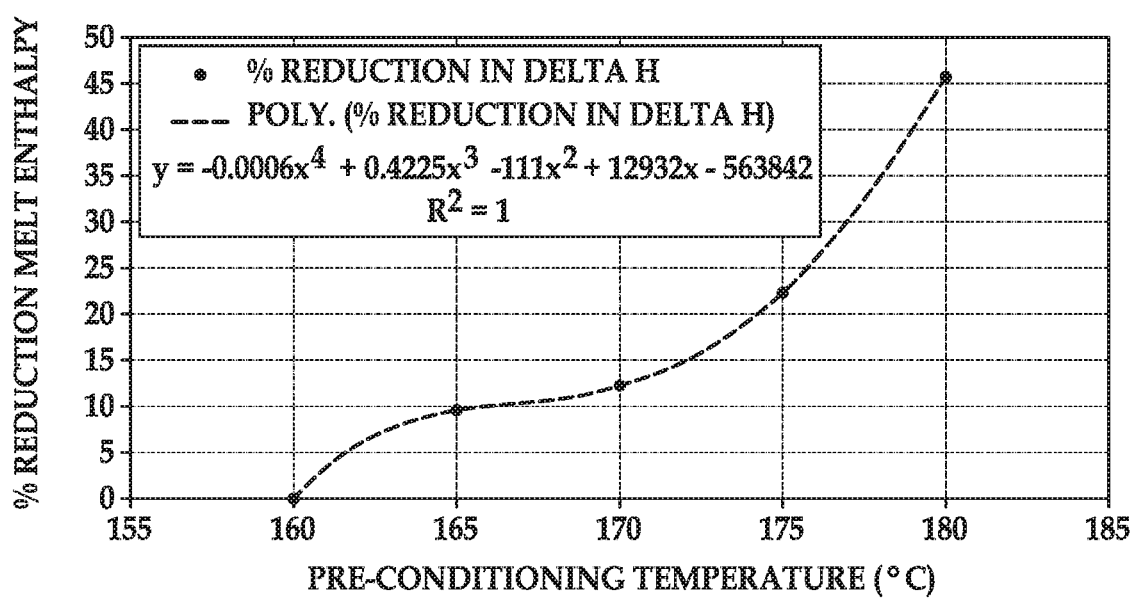
FIG. 6 is a graph depicting the percent reduction in melt enthalpy of examples of the preconditioned polymer build material and of a comparative example of preconditioned polymer build material (as compared to the melt enthalpy of the corresponding untreated polymer build material) as a function of the preconditioning temperature, with the percent reduction in melt enthalpy (in %) shown on the y-axis and the preconditioning temperatures (in ° C.) shown on the x-axis.

The melt enthalpies of the examples of the preconditioned polymer build material and the comparative example of preconditioned polymer build material were measured using a differential scanning calorimeter (DSC). FIG. 5 shows a graph of the melt enthalpies of the examples of the preconditioned polymer build material and the comparative example of preconditioned polymer build material. In FIG. 5, the melt enthalpy values (in J/g) are shown on the y-axis and the temperatures to which the untreated polyamide 12 was heated (in ° C.) are shown on the x-axis. FIG. 6 shows a graph of the percent reduction of the melt enthalpy of the examples of the preconditioned polymer build material and of the comparative example of preconditioned polymer build material, as compared to the melt enthalpy of the corresponding untreated polymer build material. In FIG. 6, the percent reduction in melt enthalpy (in %) is shown on the y-axis and the temperatures to which virgin/untreated polyamide 12 was heated (in ° C.) are shown on the x-axis. The curve shown in FIG. 6 was fitted using polynomial curve fitting (labeled "Poly. (% Reduction in Delta H")), and the equation is the corresponding fifth degree polynomial equation.

As shown in FIGS. 5 and 6, the melt enthalpies of the examples of the preconditioned polymer build material were reduced by between about 10% and about 45% (as compared to the melt enthalpy of the corresponding untreated polymer build material). As also shown in FIGS. 5 and 6, the melt enthalpy of the comparative example of preconditioned polymer build material was not reduced. It was unexpected that the melt enthalpies of the examples of the preconditioned polymer build material would be reduced (when compared to the melt enthalpy of the corresponding untreated polymer build material) because the untreated polymer build materials used to form the examples of the preconditioned polymer build material did not go through a full thermal cycle (i.e., the untreated polymer build material was not melted).

Example 2

Two additional examples of the preconditioned polymer build material disclosed herein were prepared, and one example of the preconditioned polymer composite build material disclosed herein was prepared. For one of the additional examples of the preconditioned polymer build material, untreated polyamide 12 (PA 12) was exposed to a partial thermal cycle including heating the untreated polyamide 12 to a temperature of 170° C. (i.e., 18.8° C. below the melting point of the polymer component of the untreated polymer build material) for 5 minutes. For the other additional example of the preconditioned polymer build material, untreated polyamide 11 (PA 11) was exposed to a partial thermal cycle including heating the virgin/untreated polyamide 11 to a temperature of 180° C. (i.e., 17° C. below the melting point of the polymer component of the untreated polymer build material) for 5 minutes. For the example of the preconditioned polymer composite build material, a untreated composite of polyamide 12 (PA 12) and 3 wt % of titanium dioxide (based on the total weight of the untreated composite) was exposed to a partial thermal cycle including heating the untreated composite to a temperature of 170° C. (i.e., 18.8° C. below the melting point of the polymer component of the untreated polymer composite build material) for 5 minutes.

The percent crystallinity by volume of each of the preconditioned polymer or polymer composite build materials was measured, and the percent crystallinity of each of the corresponding untreated polymer or polymer composite build materials was measured using a D8 Discover diffractometer (available from Bruker). The results of the percent crystallinity are shown in Table 1.

TABLE 1

| polymer or polymer composite build material | percent crystallinity by volume (vol %) |
|---|---|
| preconditioned polyamide 12 | 50.7 |
| untreated polyamide 12 | 51.2 |
| preconditioned composite of polyamide 12 and 3 wt % of titanium dioxide | 49.9 |
| untreated composite of polyamide 12 and 3 wt % of titanium dioxide | 50.8 |
| preconditioned polyamide 11 | 56.2 |
| untreated polyamide 11 | 57.4 |

As shown in Table 1, the percent crystallinity of the preconditioned polyamide 12 was reduce by about 0.5 vol % (as compared to the corresponding untreated polymer build material), the percent crystallinity of the preconditioned composite polyamide 12 and titanium dioxide was reduce by about 0.9 vol % (as compared to the corresponding untreated polymer composite build material), and the percent crystallinity of the preconditioned polyamide 11 was reduce by about 1.2 vol % (as compared to the corresponding untreated polymer build material). It was unexpected that the percent crystallinities of the examples of the preconditioned polymer or polymer composite build material would be reduced (as compared to the percent crystallinity of the corresponding untreated polymer or polymer composite build material) because the untreated polymer or polymer composite build materials used to form the examples of the preconditioned polymer or polymer composite build material did not go through a full thermal cycle (i.e., the untreated polymer or polymer composite build material was not melted).

It is to be understood that the ranges provided herein include the stated range and any value or sub-range within the stated range. For example, from about 0.5% to about 3% should be interpreted to include not only the explicitly recited limits of from about 0.5% to about 3%, but also to include individual values, such as about 0.8%, about 1.31%, about 2%, about 2.785%, about 2.95%, etc., and sub-ranges, such as from about 0.85% to about 2.35%, from about 1.21% to about 2.95%, from about 1.5% to about 2.35%, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A build material for three-dimensional (3D) printing, comprising:
   a preconditioned polymer or polymer composite build material, wherein a percent crystallinity of the preconditioned polymer or polymer composite build material is reduced by a volume percentage ranging from about 0.5% to about 3% compared to a percent crystallinity of a corresponding untreated polymer or polymer composite build material.

2. The build material as defined in claim 1 wherein the preconditioned polymer or polymer composite build material has a reduced melting point and a reduced melt enthalpy compared to a melting point and a melt enthalpy of the corresponding untreated polymer or polymer composite build material.

3. The build material as defined in claim 1 wherein:
   the preconditioned polymer or polymer composite build material is polyamide 12 exposed to a partial thermal cycle, and the percent crystallinity is reduced by up to 1 vol. %; or
   the preconditioned polymer or polymer composite build material is a composite of polyamide 12 and titanium dioxide exposed to a partial thermal cycle, and the percent crystallinity is reduced by up to 2 vol. %; or
   the preconditioned polymer or polymer composite build material is polyamide 11 exposed to a partial thermal cycle, and the percent crystallinity is reduced by up to 2.5 vol. %.

4. The build material as defined in claim 1, further comprising a corresponding recycled polymer or polymer composite build material mixed with the preconditioned polymer or polymer composite build material.

5. The build material as defined in claim 1 wherein the preconditioned polymer or polymer composite build material is one of:
polymer particles exposed to a partial thermal cycle, the polymer particles being selected from the group consisting of a polyamide, polyethylene, polypropylene, polyoxomethylene, a polystyrene, polycarbonate, a polyester, a polyurethane, and combinations thereof; or
a polymer ceramic composite exposed to a partial thermal cycle, the polymer ceramic composite including a blend of the polymer particles and ceramic particles, the ceramic particles being selected from the group consisting of metal oxides, inorganic glasses, carbides, nitrides, and borides.

6. A method of forming a 3D printing build material mixture, comprising:
exposing an untreated polymer or polymer composite build material to a partial thermal cycle involving:
heating the untreated polymer or polymer composite build material to a temperature ranging from about 25° C. to about 5° C. below a melting point of a polymer component of the untreated polymer or polymer composite build material to achieve a change in a crystalline structure of the untreated polymer or polymer composite build material and to form a preconditioned polymer or polymer composite build material; and
cooling the preconditioned polymer or polymer composite build material; and
mixing the preconditioned polymer or polymer composite build material with a corresponding recycled polymer or polymer composite build material, thereby forming the 3D printing build material mixture.

7. The method as defined in claim 6 wherein the temperature ranges from about 35° C. to about 395° C.

8. The method as defined in claim 6 wherein the heating is performed for a time period ranging from about 2 minutes to about 5 minutes.

9. The method as defined in claim 6 wherein the preconditioned polymer or polymer composite build material and the corresponding recycled polymer or polymer composite build material each has a reduced melt enthalpy ranging from about 10% to about 40% lower than a melt enthalpy of a corresponding untreated polymer or polymer composite build material.

10. The method as defined in claim 6 wherein the preconditioned polymer or polymer composite build material has a melt enthalpy within 10% of a melt enthalpy of the corresponding recycled polymer or polymer composite build material.

11. The method as defined in claim 6 wherein prior to mixing the preconditioned polymer or polymer composite build material with the corresponding recycled polymer or polymer composite build material, the method further comprises sieving the preconditioned polymer or polymer composite build material to at least substantially reduce agglomeration.

12. A method for three-dimensional (3D) printing, comprising:
forming a build material layer including at least some of a preconditioned polymer or polymer composite build material, wherein a percent crystallinity of the preconditioned polymer or polymer composite build material is reduced by a volume percentage ranging from about 0.5% to about 3% compared to a percent crystallinity of a corresponding untreated polymer or polymer composite build material;
selectively applying a fusing agent on at least a portion of the build material layer; and
exposing the build material layer to electromagnetic radiation to fuse the at least the portion.

13. The method as defined in claim 12 wherein prior to forming the build material layer, the method further comprises:
exposing an untreated polymer or polymer composite build material to a partial thermal cycle involving:
heating the untreated polymer or polymer composite build material to a temperature ranging from about 25° C. to about 5° C. below a melting point of a polymer component of the untreated polymer or polymer composite build material to achieve a change in a crystalline structure of the untreated polymer or polymer composite build material and to form the preconditioned polymer or polymer composite build material; and
cooling the preconditioned polymer or polymer composite build material.

14. The method as defined in claim 13 wherein the temperature ranges from about 35° C. to about 395° C., and wherein the heating is performed for a time period ranges from about 2 minutes to about 5 minutes.

15. The method as defined in claim 13 wherein:
prior to forming the build material layer, the method further comprises mixing the preconditioned polymer or polymer composite build material with a corresponding recycled polymer or polymer composite build material, thereby forming a 3D printing build material mixture; and
the 3D printing build material mixture is applied to form the build material layer.

* * * * *